(12) United States Patent
Maiwald et al.

(10) Patent No.: US 11,027,619 B2
(45) Date of Patent: Jun. 8, 2021

(54) CHARGING STATION, MOTOR VEHICLE AND METHOD FOR INDUCTIVE CHARGING OF A BATTERY OF A MOTOR VEHICLE

(71) Applicant: AUDI AG, Ingolstadt (DE)

(72) Inventors: Stefan Maiwald, Ingolstadt (DE); Johann Schneider, Wettstetten (DE)

(73) Assignee: AUDI AG, Ingolstadt (DE)

( * ) Notice: Subject to any disclaimer, the term of this patent is extended or adjusted under 35 U.S.C. 154(b) by 322 days.

(21) Appl. No.: 16/323,852

(22) PCT Filed: Aug. 3, 2017

(86) PCT No.: PCT/EP2017/069607
§ 371 (c)(1),
(2) Date: Feb. 7, 2019

(87) PCT Pub. No.: WO2018/046199
PCT Pub. Date: Mar. 15, 2018

(65) Prior Publication Data
US 2019/0168625 A1 Jun. 6, 2019

(30) Foreign Application Priority Data
Sep. 7, 2016 (DE) .................... 10 2016 216 939.4

(51) Int. Cl.
*B60L 53/124* (2019.01)
*H02J 50/12* (2016.01)
(Continued)

(52) U.S. Cl.
CPC .......... *B60L 53/124* (2019.02); *B60L 53/122* (2019.02); *H01F 38/14* (2013.01); *H02J 50/12* (2016.02);
(Continued)

(58) Field of Classification Search
CPC .................................................. B60L 53/124
(Continued)

(56) References Cited

U.S. PATENT DOCUMENTS

2014/0191715 A1* 7/2014 Wechlin .................. H02J 50/60
320/108
2015/0276965 A1* 10/2015 Turki ....................... B60L 3/00
324/207.17
(Continued)

FOREIGN PATENT DOCUMENTS

DE 102011050655 A1 11/2012
DE 102012218194 A1 4/2014
(Continued)

OTHER PUBLICATIONS

International Preliminary Report on Patentability (Chapter I) dated Mar. 21, 2019 in corresponding International Application No. PCT/EP2017/069607; 8 pages.
(Continued)

*Primary Examiner* — Jerry D Robbins
(74) *Attorney, Agent, or Firm* — Maier & Maier, PLLC

(57) ABSTRACT

A charging station for the inductive charging of a battery of a motor vehicle. A primary resonant circuit for generating an electrical oscillation, the primary resonant circuit has a primary capacitor and a primary coil. The charging station includes a measuring device designed to excite the primary resonant circuit up to a predefinable voltage amplitude, then
(Continued)

to interrupt the excitation of the primary resonant circuit and to evaluate the time function of the voltage amplitude of the primary resonant circuit after the interruption of the excitation of the primary resonant circuit.

11 Claims, 3 Drawing Sheets

(51) Int. Cl.
  *H02J 50/60* (2016.01)
  *B60L 53/122* (2019.01)
  *H01F 38/14* (2006.01)

(52) U.S. Cl.
  CPC ............... *H02J 50/60* (2016.02); *Y02T 10/70* (2013.01); *Y02T 10/7072* (2013.01); *Y02T 90/12* (2013.01); *Y02T 90/14* (2013.01)

(58) Field of Classification Search
  USPC .......................................................... 320/108
  See application file for complete search history.

(56) References Cited

U.S. PATENT DOCUMENTS

| | | | |
|---|---|---|---|
| 2015/0355359 A1* | 12/2015 | Miyashita | G01V 3/10 324/207.16 |
| 2015/0355360 A1* | 12/2015 | Miyashita | G01V 3/10 320/108 |
| 2016/0218567 A1 | 7/2016 | Nakano et al. | |
| 2017/0033615 A1* | 2/2017 | Asanuma | H02J 5/005 |

FOREIGN PATENT DOCUMENTS

| | | |
|---|---|---|
| DE | 102014207253 A1 | 10/2015 |
| DE | 102014223623 A1 | 3/2016 |
| EP | 2891575 A1 | 7/2015 |

OTHER PUBLICATIONS

Examination Report dated Jun. 30, 2018 in corresponding German Application No. 10 2016 216 939.4; 25 pages.
International Search Report dated Nov. 16, 2017 in corresponding International Application No. PCT/EP2017/069607; 4 pages.

* cited by examiner

CHARGING STATION, MOTOR VEHICLE AND METHOD FOR INDUCTIVE CHARGING OF A BATTERY OF A MOTOR VEHICLE

FIELD

The present invention relates to a charging station for the inductive charging of a battery of a motor vehicle comprising a primary resonant circuit for generating an electrical oscillation, wherein the primary resonant circuit has a primary capacitor and a primary coil. Furthermore, it relates to a motor vehicle comprising a charging device for inductive charging of a battery of the motor vehicle, wherein the motor vehicle has a secondary resonant circuit having a secondary capacitor and a secondary coil, wherein a rectifier is connected between the secondary resonant circuit and the battery of the motor vehicle. It further relates to a system for inductive charging comprising such a charging station as well as such a motor vehicle. Finally, the invention relates to a method for inductive charging of a battery of a motor vehicle by means of a charging station, comprising a primary resonant circuit with a primary capacitor and a primary coil for generating an electrical oscillation, wherein the motor vehicle comprises a secondary resonant circuit having a secondary capacitor and a secondary coil, wherein a rectifier is connected between the secondary resonant circuit and the battery of the motor vehicle.

BACKGROUND

In electric vehicles, it is preferable to charge the batteries of the motor vehicle via inductive charging, i.e., without a plug-in connection. High currents and relatively high frequencies are used for the efficient inductive transfer of energy. The frequencies typically lie in the range between 50 kHz and 100 kHz.

For the charging, a large external charger with a coil is brought up to the vehicle or, conversely, the vehicle is moved to the external charger. The vehicle for its part has a secondary coil near the surface of the motor vehicle, so that the charging current can be transferred via induction from the primary-side coil of the charger to the secondary-side coil of the motor vehicle. In this process, no ferritic object or even any conductive metals may be present between the induction coils, since the strong alternating magnetic field will produce either iron losses in ferritic materials or eddy currents in conductive objects, such as aluminum foil, coins, dials, wires, nails, etc., and may heat them significantly on account of the intense power dissipation. This may cause damage to the charging device and also fires in the worst case.

The present invention basically relates to the problem of how such damage or risk of a fire can be avoided.

DE 10 2014 207 253 A1, which has been used for the wording of the preambles of the independent claims, relates to a device and a method of determining the presence of an electrically conductive body during inductive charging. One must prevent electrically conductive bodies from getting into the large air gap between the primary coil and the secondary coil. Namely, the electrically conductive body may become heated on account of the action of the charging field in the air gap. In the worst case, such as with metal-coated plastics or metal-coated paper, a spontaneous combustion of the body may occur. The device comprises a transmitter by which a transmitted signal can be sent out in the form of a magnetic field. Furthermore, the device comprises a receiver, which can receive the transmitted signal or portions of it. In particular, the reception signal may be influenced by the electrically conductive body. This influencing or change in the magnetic field may be detected by the receiver. Hence, with the teaching of this document, an electrically conductive body can be detected by detecting a change in a magnetic field.

From DE 10 2014 223 623 A1 there is known a device and a method for operating an inductive charging process of a vehicle. In order to detect a foreign metallic object between the charging station-side exciter coils and the vehicle-side induction coils, a temperature change is detected, such as results from induction of eddy currents in the foreign metallic body.

From EP 2 891 575 A1 there is known a transmitter element for a system of inductive energy transfer for a vehicle. Additional capacitive sensors are provided for the detecting of objects of very kind and especially including living creatures and animals at the charging station, similar to a touch screen. This method is based on the measurement of the discharge time or a resonance frequency detuning by means of these capacitive sensors. It utilizes the fact that capacitances exist between different regions of the primary coil. The magnitudes of these capacitances are changed upon the approaching of a living creature or a foreign body, so that the current value, which can be determined by a measurement layout, makes it possible to detect the presence of a living body or a foreign body. The current value of the respective capacitance is evaluated. The change in capacitance is evaluated in that the capacitance being measured is part of an oscillating circuit and the resonance frequency of this oscillating circuit is measured.

SUMMARY

The problem which the present invention proposes to solve is to modify an aforementioned charging station, an aforementioned motor vehicle, an aforementioned system and an aforementioned method for inductive charging such that a ferritic object can be detected between the primary and the secondary coil with the lowest possible expense and thus with the lowest possible costs.

The present invention is based on the finding that this can be accomplished especially favorably in terms of expense and costs by evaluating a signal which is present anyway. As shall be presented in further detail in the following, the voltage amplitude of the respective oscillating circuit is influenced on both the primary and the secondary side by an interruption and subsequent short-circuiting of the excitation of the respective oscillating circuit with the presence of a ferritic object between the induction coils. Accordingly, if this voltage amplitude is detected and evaluated, conclusions may be drawn as to whether a ferritic object is present between the primary and secondary coil.

According to the invention, therefore, the charging station furthermore comprises a measuring device, which is designed to excite the primary resonant circuit up to a predefinable voltage amplitude, then to interrupt the excitation of the primary resonant circuit and to evaluate the time function of the voltage amplitude of the primary resonant circuit after the interruption of the excitation of the primary resonant circuit. As already mentioned, the invention may also be realized on the secondary side. Accordingly, the charging device of the motor vehicle further comprises a measuring device, which is designed to evaluate the time function of the voltage amplitude of the secondary resonant circuit after an interruption of the excitation of the secondary resonant circuit.

Since the damping appears in the exponent of the equation for the decaying oscillation of the respective voltage amplitude, significant differences will occur already for a slight modification of the damping rate. In this way, the presence of ferritic objects between primary and secondary coil can be detected very reliably at minimal expense and minimal cost.

Especially preferably, the measuring device is designed to interrupt the excitation of the primary resonant circuit in a first step and to short-circuit the primary resonant circuit in a second step. By the short-circuiting of the primary resonant circuit, a defined initial state is created, which can be used as the basis for the following evaluation of the decaying oscillation.

The measuring device is furthermore preferably designed to determine a predefinable parameter in order to evaluate the time function of the voltage amplitude of the primary resonant circuit after the interruption of the excitation and the short-circuiting of the primary resonant circuit, in particular the voltage amplitude after a predefinable time, and/or the length of time until a predefinable voltage amplitude is measurable, and/or the damping rate of the voltage amplitudes, especially the amplitude ratio of two consecutive oscillations. It is not necessary to evaluate two immediately consecutive oscillations. Depending on how the charging station is outfitted, one or the other variant may be given the preference.

In this context, the measuring device may be furthermore designed to compare the parameter determined during the evaluation of the time function of the voltage amplitude of the primary resonant circuit after the interruption of the excitation of the primary resonant circuit against a reference value and to put out information in dependence on the comparison as to whether the inductive charging is enabled or not. The reference value is determined in advance, without any object being located between the primary coil and the secondary coil. In such a calibration process, magnetic losses of the overall layout are taken into account. Preferably, reference values for different combinations of charging station and motor vehicle are determined in advance, for example at the factory, and stored in the charging station or in the motor vehicle and provided for the mentioned comparison.

It may also be provided that the reference values are stored only in the charging station or only in the motor vehicle and are transmitted as needed to the respective counterpart.

The measuring device is preferably coupled to a connection between the primary capacitor and the primary coil in order to detect the voltage amplitude being evaluated, especially across a shunt resistor and/or a voltage divider.

In one preferred exemplary embodiment, the primary resonant circuit is constructed as a full bridge circuit, while the measuring device is designed to interrupt the excitation of the primary resonant circuit and to short-circuit the full bridge circuit, in particular by conductive switching of the two low-lying switches of the full bridge circuit. The switches of the full bridge circuit are actuated crosswise for the charging of the oscillating circuit.

In one preferred embodiment of a motor vehicle according to the invention, the measuring device is designed to determine whether the rectifier is blocking, and the measuring device is further designed to evaluate the time function of the voltage amplitude of the secondary resonant circuit only when the rectifier is blocking. The blocking of the rectifier ensures that no energy is transferred from the secondary resonant circuit to the battery being charged. Accordingly, deviations of the decaying oscillation as compared to a reference value result solely from a ferritic object located between primary and secondary coil.

The preferred embodiments and their benefits as presented with regard to the charging station according to the invention or the motor vehicle according to the invention hold accordingly, insofar as is applicable, for a system according to the invention for inductive charging, comprising a charging station according to the invention as well as a motor vehicle according to the invention. The same holds for the method according to the invention.

In one preferred embodiment of the method according to the invention, in step a) the predefinable voltage amplitude is dimensioned such that the rectifier of the motor vehicle is blocking. In this way, it is likewise ensured once more that the respective decaying voltage amplitude from a reference value is not due to a charging of the vehicle battery.

Preferably, in step a) the primary resonant circuit is excited to its rated voltage. Whereas for an excitation to a predefinable voltage amplitude at which the rectifier of the motor vehicle is blocking a short-circuiting of the primary resonant circuit is not absolutely required, it must be done for an excitation of the primary resonant circuit to its rated voltage, for otherwise there is a danger that the battery of the motor vehicle will be charged and thus the measurement will be falsified.

Step c) may be performed in the charging station and/or in the motor vehicle. Since the number of different types of charging stations will be less than the number of types of motor vehicles being charged, an evaluation in the motor vehicle affords the benefit that only reference values need to be stored there for the manageable number of types of charging stations.

Further preferred embodiments will emerge from the dependent claims.

BRIEF DESCRIPTION OF THE DRAWINGS

In the following, an exemplary embodiment of the present invention shall now be described more closely with reference to the enclosed drawings. These show.

DETAILED DESCRIPTION

Figure 1:
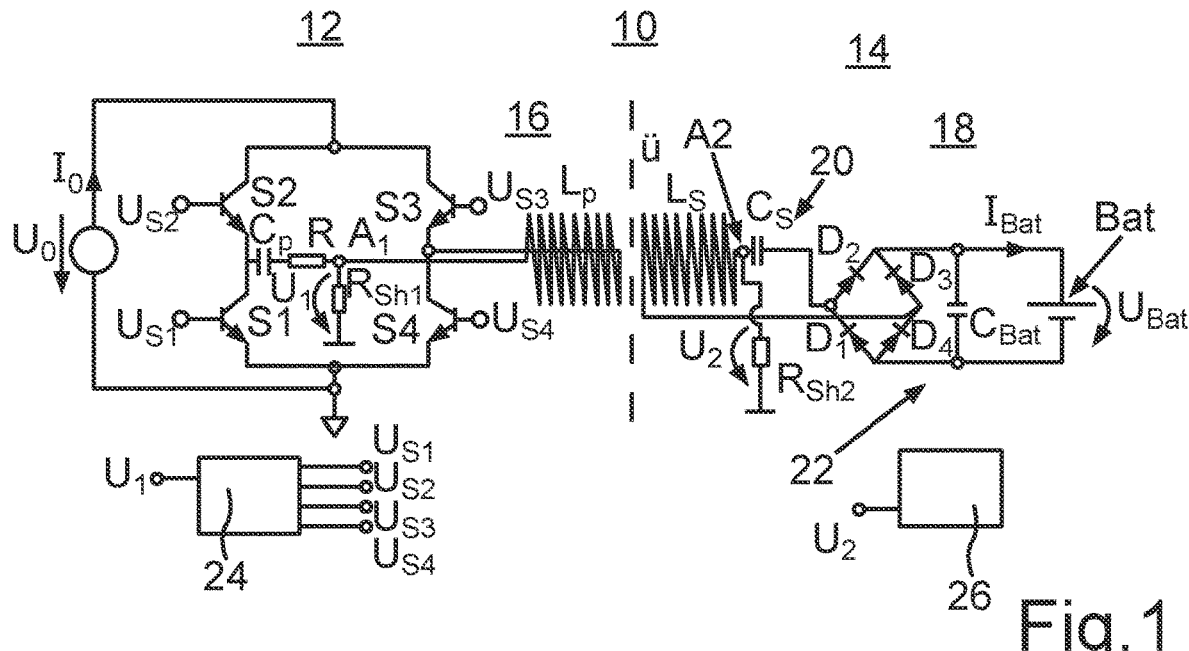
FIG. 1 in schematic representation, an exemplary embodiment of a system according to the invention for inductive charging, comprising a charging station according to the invention and a motor vehicle according to the invention.

FIG. 1 shows in schematic representation a system 10 according to the invention for inductive charging of a battery Bat of a motor vehicle 14. This system comprises a charging station 12, of which FIG. 1 shows only the parts which are relevant in regard to the present invention. The same holds for the motor vehicle 14 according to the invention.

The charging station 12 comprises an electrical oscillating circuit 16, which in the exemplary embodiment is designed as a full bridge circuit and comprises the switches S1, S2, S3 and S4. Even though these are represented in the present case as bipolar transistors, they are realized even more preferably as MOSFET transistors, IGBTs or the like. The control electrode of the switch S1 is actuated with a potential $U_{S1}$, the control electrode of the switch S2 with a potential $U_{S2}$, the control electrode of the switch S3 with a potential $U_{S3}$ and the control electrode of the switch S4 with a potential $U_{S4}$. For the charging of the oscillating circuit 16, the switches S1 to S4 are actuated crosswise, in the way familiar to the skilled person. The oscillating circuit 16 is energized from a voltage source $U_0$ which provides a current $I_0$. The voltage source $U_0$ is preferably a rectified mains voltage.

The oscillating circuit comprises a primary capacitor $C_P$, a primary coil $L_P$, an ohmic resistance R, coupled between the primary capacitor $C_P$ and the primary coil $L_P$, and a shunt resistor $R_{Sh1}$, which is coupled with a tapping point A1 between the primary capacitor $C_P$ and the primary coil $L_P$ and across which a first tapping voltage $U_1$ decays.

The charging station 12 further comprises a measuring device 24, which is designed to excite the primary resonant circuit 16 by corresponding providing of the potentials $U_{S1}$, $U_{S2}$, $U_{S3}$ and $U_{S4}$ up to a predefinable voltage amplitude, and then to interrupt the excitation of the primary resonant circuit 16, to short-circuit the primary resonant circuit and to evaluate the time function of the voltage amplitude $U_1$ of the primary resonant circuit 16 after the interruption of the excitation of the primary resonant circuit 16.

The motor vehicle 14 comprises a charging device 18 for the inductive charging of the battery Bat of the motor vehicle 14, with a battery potential $U_{Bat}$ decaying across the battery Bat. The charging device 18 comprises a secondary resonant circuit 20 with a secondary capacitor $C_S$ and a secondary coil $L_S$. The transfer ratio between the primary coil $L_P$ and the secondary coil $L_S$ is denoted as ü. Between the secondary resonant circuit 20 and the battery Bat of the motor vehicle 14 there is switched a rectifier 22, which comprises the diodes D1, D2, D3 and D4. A capacitor $C_{Bat}$ is switched in parallel with the battery Bat. The charging device 18 further comprises a shunt resistor $R_{Sh2}$, which is coupled with a tapping point A2 between the secondary coil $L_S$ and the secondary capacitor $C_S$ and across which a tapping voltage $U_2$ decays.

The charging device 18 further comprises a measuring device 26, which is designed to evaluate the time function of the voltage amplitude $U_2$ of the secondary resonant circuit 20 after the creating or detecting of an interruption of the excitation of the secondary resonant circuit 20.

As shall be further explained more precisely below, either a measuring device 24 or a measuring device 26 may be present, but both measuring devices 24, 26 may also be provided.

In general, the charging of the battery Bat occurs such that the primary resonant circuit 16 is charged and an alternating voltage is transferred by coupling of the primary coil $L_P$ with the secondary coil $L_S$ to the secondary side, i.e., the charging device 18. This alternating voltage is rectified in the rectifier 22, then smoothed out by means of the capacitor $C_{Bat}$, and brings the battery Bat being charged up to the rated voltage, which may amount to 400 V for example. The excitation frequency is preferably between 50 kHz and 100 kHz. The transformation ratio is preferably around 1:1. Before further explaining the present invention, we shall first go into the physical principles more closely.

Figure 2:
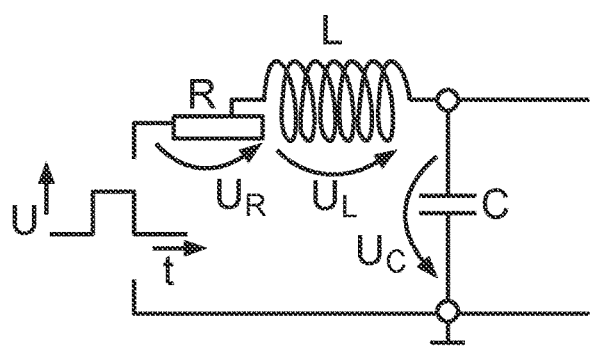
FIG. 2 in schematic representation, a circuit arrangement of an oscillating circuit known in the prior art.

As an example of damped oscillations, the LRC oscillating circuit represented in FIG. 2 shall be discussed. The following mesh rule results:

$$U_L + U_C + U_R = 0 = L*dI/dt + Q/C + RI = L*d^2Q/dt^2 + R*dQ/dt + Q/C,$$

where Q denotes the energy fluctuating between the capacitor C and the coil L and I denotes the corresponding current.

We thus obtain the resonance frequency of the undamped system as:

$$\omega_0 = \frac{1}{\sqrt{LC}}.$$

For the coefficient of decay β we obtain $$\beta = \frac{R}{2L}.$$

In the oscillating circuit shown, the energy changes between $0.5*C*U^2$ (energy in the capacitor C) and $0.5*L*I^2$ (energy in the coil). The resistances in the circuit, i.e., the ohmic resistance R and stray resistances of the capacitor and the coil, as well as the wires, ensure a corresponding damping.

Figure 3:
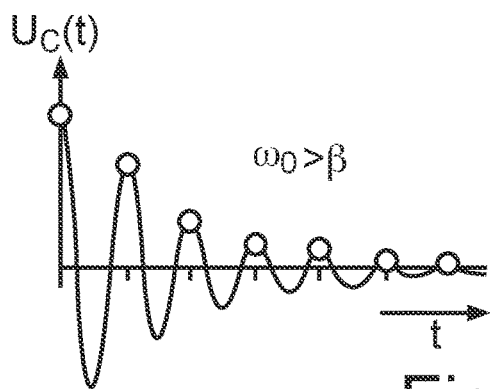
FIG. 3 a decaying oscillation for the oscillating circuit represented in FIG. 2 under weak damping $\omega_0 > \beta$.

FIG. 3 shows in this context the curve of the potential $U_C$ as a function of the time t for the case $\omega_0 > \beta$. The eigenfrequency $\omega_0$ is thus larger than the damping constant 13. The system then behaves in a first approximation as an undamped oscillator with decaying amplitude. The solution in this region can be written as $$U_C(t) = U_0 * e^{-\beta t} \cos(\omega_S t + \varphi),$$

where the amplitude $U_0$ and the phase $\varphi$ are to be determined from the initial conditions. The amplitude thus decays exponentially and the oscillating frequency is lower, $\omega_S < \omega_0$.

The energy $E_{tot}(t)$ is proportional to the square of the amplitude $U_0 e^{-\beta t}$; it thus decays at twice the rate:

$$E_{tot}(t) = E_{tot}(0) e^{-2\beta t}.$$

From the measured data, the parameters $\omega_S$ and β can be determined. One obtains $\omega_S$ from the period T; the decay coefficient β can be determined by comparing the amplitude at different times. If one compares the deflections at two times, differing by one period, the oscillatory component drops out and one obtains $$U_C(t+T)/U_C(t)=e^{-\beta T},$$

that is $$\beta = -\ln\left[\frac{U_C(t+T)}{U_C(t)}\right]/T.$$

Figure 4:
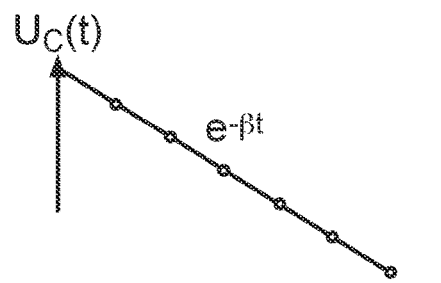
FIG. 4 the representation of FIG. 3, showing the amplitude of oscillation logarithmically.

FIG. 4 shows the time function of the potential $U_C(t)$ in logarithmic representation. Accordingly, with no perturbation, a linear curve results.

Returning to FIG. 1: the measuring device 24 is generally designed to interrupt the excitation of the primary resonant circuit 16 in a first step and to short-circuit the primary resonant circuit 16 in a second step. It is furthermore designed to determine a predefinable parameter in order to evaluate the time function of the voltage amplitude $U_1$ of the primary resonant circuit 16 after the interruption of the excitation and the short-circuiting of the primary resonant circuit 16. In particular, the amplitude of the potential $U_1$ after a predefinable time and/or the length of time until a predefinable amplitude of the potential $U_1$ is measurable, and/or the damping rate of two voltage amplitudes, especially the amplitude ratio of two consecutive oscillations, are taken into account.

The measuring device 24 is further designed to compare the parameter determined during the evaluation of the time function of the voltage amplitude $U_1$ of the primary resonant circuit 16 after the interruption of the excitation of the primary resonant circuit 16 against a reference value and to put out information in dependence on the comparison via an output device, such as a display device or a loudspeaker, as to whether the inductive charging is enabled or not. The reference value may represent the corresponding parameter which results with no foreign body between the primary and secondary coil.

A short-circuiting of the full bridge circuit S1, S2, S3, S4 occurs in particular by conductive switching of the two low-lying switches S1, S4 of the full bridge circuit.

The measuring device 26 is designed to evaluate the time function of the voltage amplitude $U_2$ of the secondary resonant circuit 20 after an interruption of the excitation of the secondary resonant circuit 20, for example one which is triggered by wireless transfer of a corresponding trigger signal to the charging station or by detection on the secondary side. In this context, the measuring device may be designed to determine whether the rectifier 22 is blocking, the measuring device 26 being designed to evaluate the time function of the amplitude of the voltage $U_2$ only if the rectifier 22 is blocking. The reason for this is the need to ensure, for a reliable evaluation of the voltage $U_2$, that no energy is flowing from the secondary resonant circuit 20 to the battery Bat. This may occur in that the voltage of the primary resonant circuit 16—with ü=1—is reduced to only a few Volts below the rectified secondary d.c. voltage $U_{Bat}$ during the excitation. Alternatively, the primary resonant circuit 16 may be built up to its rated voltage for a brief time and then at once be short-circuited across the full bridge circuit 16. After a rapid decaying to a voltage below the battery voltage $U_{Bat}$ a decaying oscillation will likewise be established, during which no further load is present on the secondary side, since the charging current for the battery Bat always flows only from the higher to the lower potential and the rectifier diodes D1 to D4 of the rectifier are blocking at the same level.

In both variants, a condition known as an "open load" is established at the secondary side. In this condition, deviations between actually measured parameters and reference values are attributable solely to a foreign body possibly present between the primary and secondary coil.

During the building up of the oscillation on the primary side, the full bridge circuit is switched through for a predefinable number of times, such as three to ten times, so that an increasing oscillation is established here. It does not need to be built up to the rated voltage. As of yet, no damage will be caused by such a brief oscillation, even if a foreign body is present between the primary and secondary coil.

If the damping—determined by the ohmic resistance R and efficiency losses—in the primary resonant circuit 16 is not influenced by foreign bodies present in the magnetic field between the primary coil $L_P$ and secondary coil $L_S$, a ratio of two consecutively occurring amplitudes of $U_1(t+T)/U_1(t)=e^{-\beta T}$ will be established, which is stored as a reference value of the decaying oscillation, where T is the length of the period and $\beta=R/2L$ is the decay coefficient. The same holds accordingly for an evaluation on the secondary side.

On the other hand, if a foreign ferritic object, i.e., a foreign metallic body or an electrically conductive object, is present in the rapidly changing magnetic field between the primary coil $L_P$ and the secondary coil $L_S$, taking up energy through eddy current losses, the consecutively occurring amplitudes will be damped more quickly. This is due to the energy loss in the oscillating circuit and will be manifested in the form of waste heat, proportional to the eddy current losses arising there.

Hence, by comparing the currently measured damping rate with the previously determined reference value, one can establish how much the energy loss in the oscillating circuit has increased, being formed there for example in the form of eddy current losses as waste heat between the charging station and the charging device, for example as caused by a foreign body. The charging station 12 switches on this test cycle preferably before the actual charging process and in event of energy losses above a predefinable threshold value it can issue a warning and/or prevent the charging process.

No contactor is required to cut out the load Bat in the secondary resonant circuit, since the rectifier diodes D1 to D4 ensure the aforementioned "open load" condition due to the low induced voltage and thus no energy is drawn from the magnetic field on the secondary side, which would affect the measurement of the amplitude damping.

With the present invention, both primary and secondary winding short circuits of the coils $L_P$ and $L_S$ can also be diagnosed, since short-circuited windings take up magnetic energy and mutually induce it, and thus will likewise dampen the ascertained curves of the voltages $U_1$ and $U_2$ more strongly than under reference conditions.

FIGS. 5a, 5b, 6a, and 6b show time functions of various quantities of the system represented in FIG. 1 for inductive charging, where $U_0$ has been chosen at 100 V and the switches S1 to S4 of the full bridge circuit have been realized by MOSFETs. The excitation frequency of the switches S1 to S4 was 50 kHz. The time functions represented in FIGS. 5a and 6a have been measured without foreign bodies between the primary coil $L_P$ and the secondary coil $L_S$, while the time functions represented in FIGS. 5b and 6b have been determined with a foreign body between the mentioned coils.

Figure 5A:
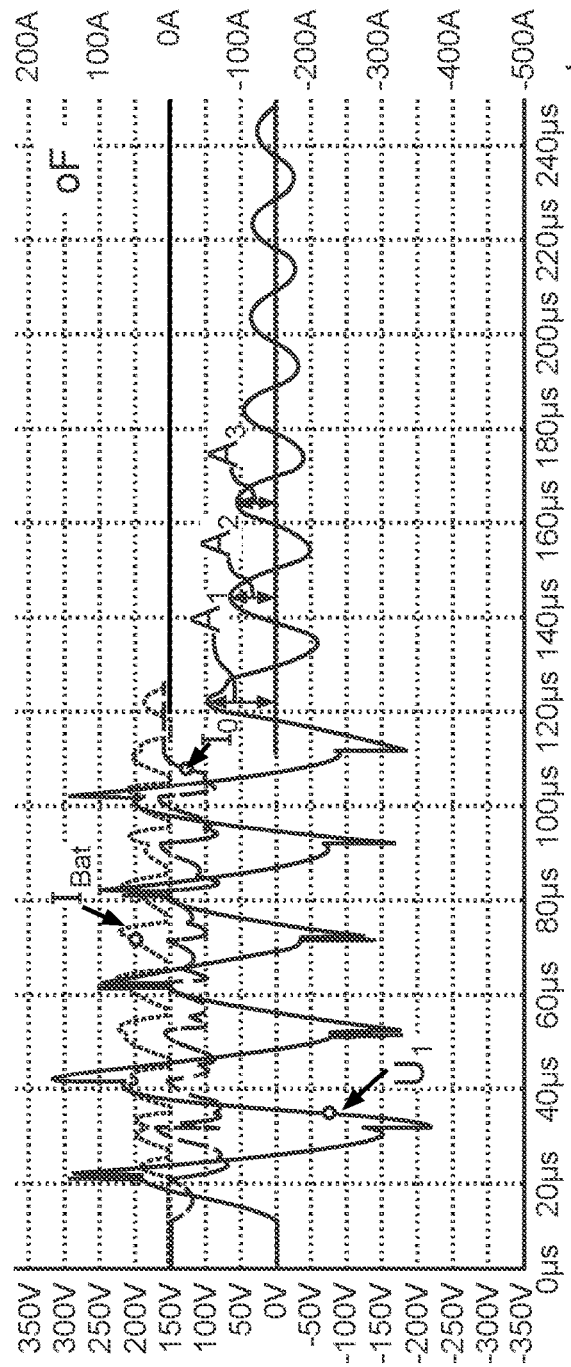
FIG. 5a the time function of the voltage tapped at the primary side of the oscillating circuit, the current of the power supply for the oscillating circuit and the battery current at the secondary side with no foreign object between primary and secondary coil in a system for inductive charging according to the invention, per FIG. 1.
Figure 5B:
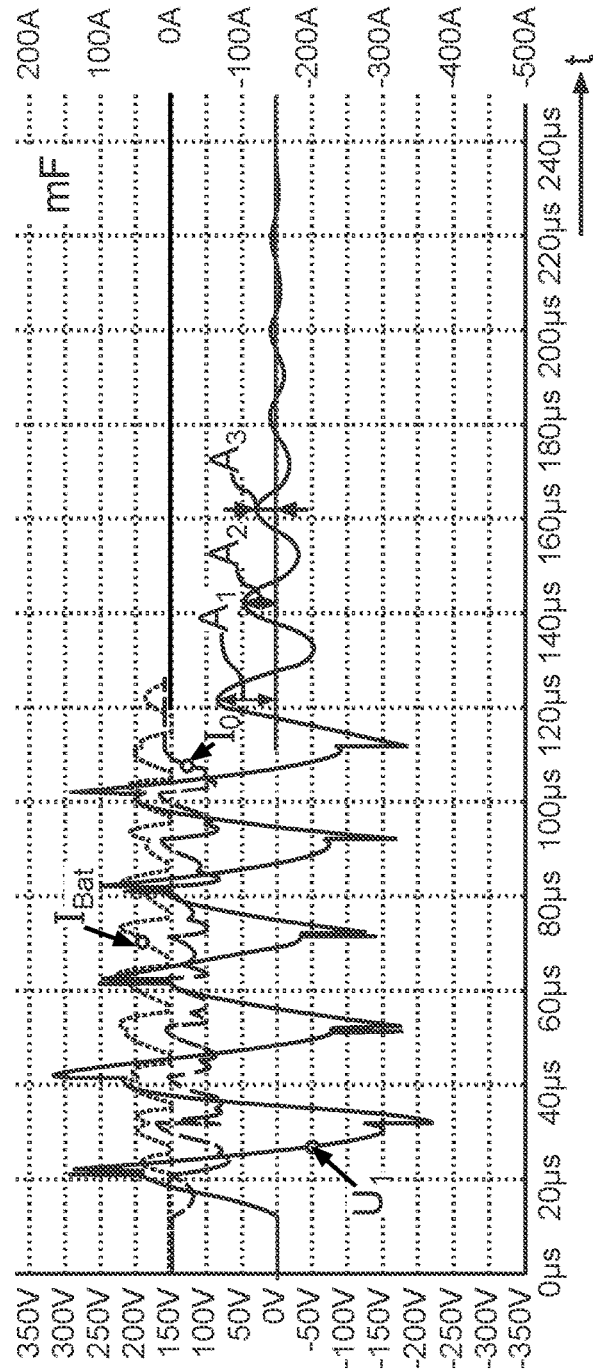
FIG. 5b the time function of the voltage tapped at the primary side of the oscillating circuit, the current of the power supply for the oscillating circuit and the battery current at the secondary side with foreign object present between primary and secondary coil in a system for inductive charging according to the invention, per FIG. 1.

For the representation in FIGS. 5a and 5b, the primary resonant circuit was excited up to 110 µs, as is shown by the curve of $I_0$. The curve of the voltage $U_1$ likewise reflects this. After the interruption of the excitation and the short-circuiting of the primary resonant circuit 16, a current $I_{Bat}$ still flows to the battery Bat of the motor vehicle 14 until such time as the secondary-side voltage has decayed so much that the rectifier 22 is blocking. In FIG. 5a, from the curve of the voltage $U_1$ after the interruption and short-circuiting of the primary resonant circuit 16 reference values can be obtained for the condition when no foreign body is present between the primary and secondary coil, for example, the ratio of two consecutively occurring oscillations A2/A1 A3/A1 or A3/A2 or the like, or the time elapsed until a particular predefinable voltage amplitude is established, or the amplitude of the voltage $U_1$ after a fixed or variable length of time.

FIG. 5b shows the corresponding curves in the event that a foreign body is present between the primary and secondary coil. As can be clearly seen, the ratio of the consecutively occurring amplitudes A2/A1, A3/A1 or A3/A2 is distinctly less than in the case of FIG. 5a. Also, the length of time until a particular voltage is established is distinctly shorter than in FIG. 5a. Accordingly, a lower amplitude can be measured (in absolute magnitude) at a fixed or variable time than in the case without a foreign body.

Figure 6A:
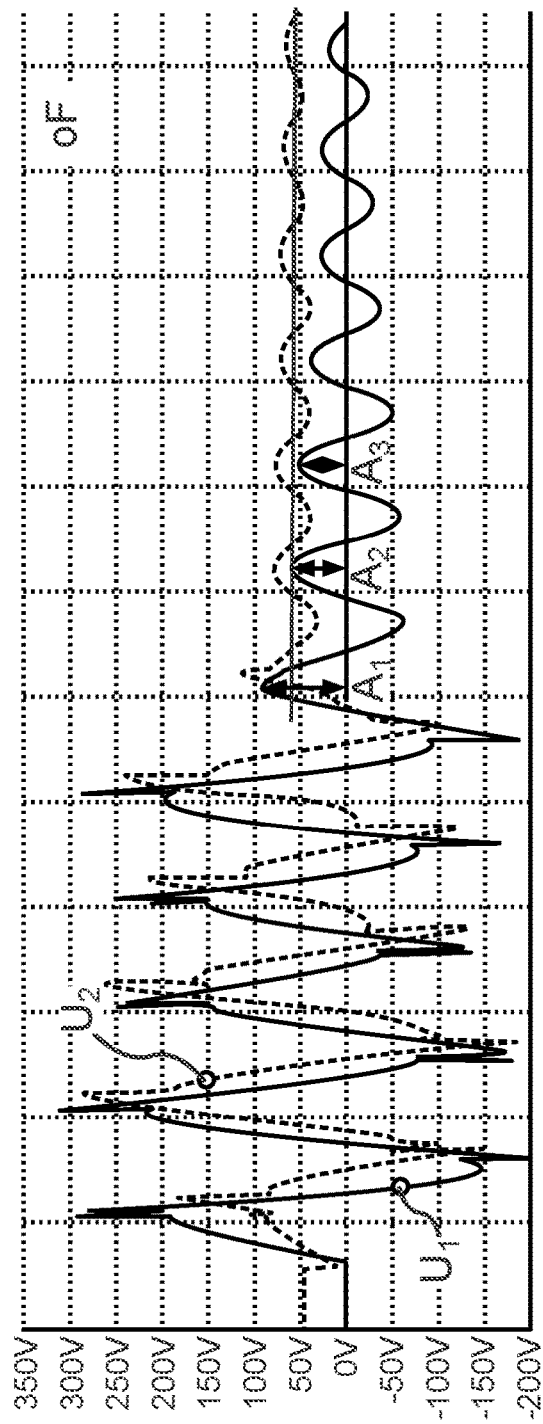
FIG. 6a the time functions for the exemplary embodiment of FIG. 5a of the primary-side voltage tapping at the oscillating circuit as well as a secondary-side voltage tapping without foreign object between primary and secondary coil.
Figure 6B:
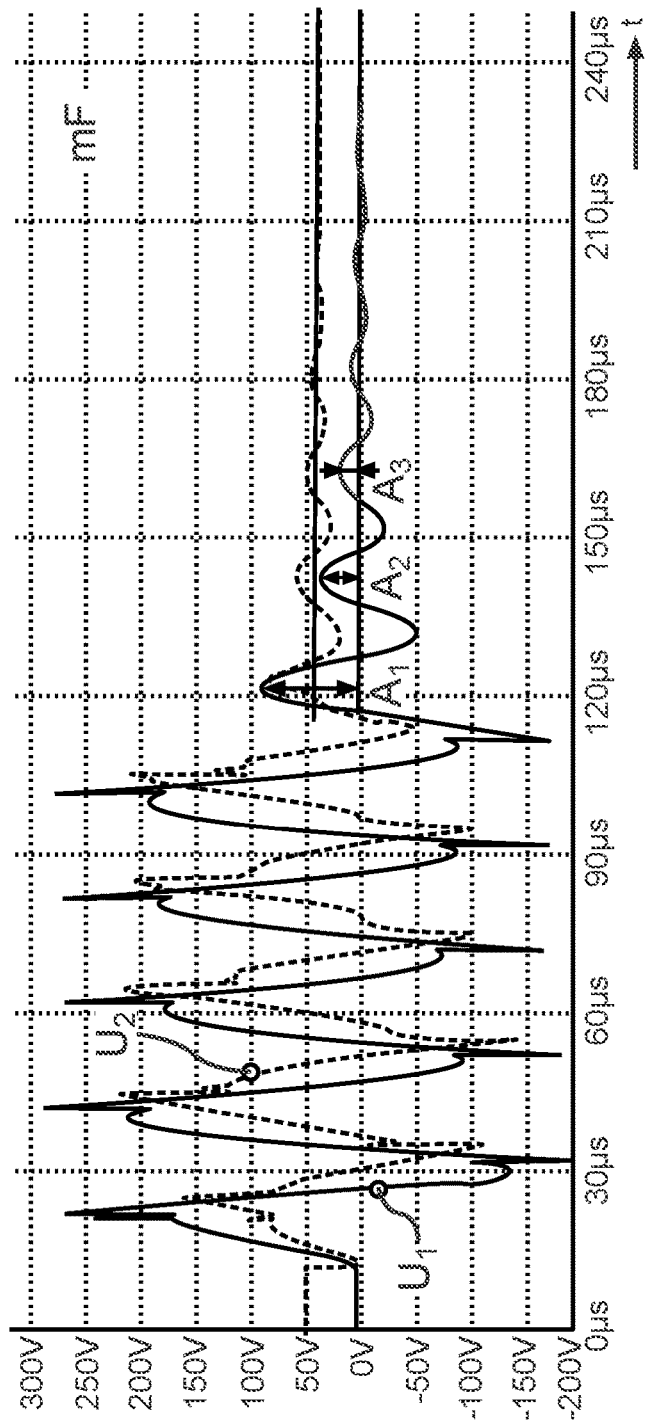
FIG. 6b the time functions for the exemplary embodiment of FIG. 5b of the primary-side voltage tapping at the oscillating circuit as well as a secondary-side voltage tapping with foreign object present between primary and secondary coil.

FIGS. 6a and 6b show the corresponding time curves for both the voltage U1 and the voltage U2. In order to separate the time curves of the more graphic representation from each other, the curve of the voltage U2 has been shifted by +50V. As a result, one may see that the presence of a foreign object between the primary and secondary coil can also be reliably deduced from the curve of the amplitude of the voltage U2 on the secondary side. Accordingly, it is left up to the user whether to realize the invention on the primary or the secondary side.

The invention claimed is:

1. A charging station for the inductive charging of a battery of a motor vehicle, comprising:
   a primary resonant circuit for generating an electrical oscillation, wherein the primary resonant circuit has a rectifier, a primary capacitor, and a primary coil, wherein the charging station includes a measuring device designed to:
      excite the primary resonant circuit up to a predefinable voltage amplitude;
      then to interrupt the excitation of the primary resonant circuit; and
      to evaluate a time function of the voltage amplitude of the primary resonant circuit after the interruption of the excitation of the primary resonant circuit,
   wherein the measuring device is designed to determine whether the rectifier is blocking, and the measuring device is further designed to evaluate the time function of the voltage amplitude of the primary resonant circuit only when the rectifier is blocking.

2. The charging station as claimed in claim 1, wherein the measuring device is designed to interrupt the primary resonant circuit in a first step and to short-circuit the primary resonant circuit in a second step.

3. The charging station as claimed in claim 1, wherein the measuring device is designed to determine a predefinable parameter in order to evaluate the time function of the voltage amplitude of the primary resonant circuit after the interruption of the excitation and the short-circuiting of the primary resonant circuit, including:
   the voltage amplitude after a predefinable time;
   the length of time until a second predefinable voltage amplitude is measurable; and/or
   a damping rate of the voltage amplitudes.

4. The charging station as claimed in claim 3, wherein the measuring device is furthermore designed to compare the parameter determined during the evaluation of the time function of the voltage amplitude of the primary resonant circuit after the interruption of the excitation of the primary resonant circuit against a reference value and to put out information in dependence on the comparison as to whether the inductive charging is enabled or not.

5. The charging station as claimed in claim 1, wherein the measuring device is coupled to a connection between the primary capacitor and the primary coil, across a shunt resistor or a voltage divider.

6. The charging station as claimed in claim 1, wherein the primary resonant circuit is constructed as a full bridge circuit, while the measuring device is designed to interrupt the excitation of the primary resonant circuit and to short-circuit the full bridge circuit, by conductive switching of two low-lying switches of the full bridge circuit.

7. A motor vehicle, comprising:
   a charging device for inductive charging of a battery of the motor vehicle, wherein the charging device has a secondary resonant circuit having a secondary capacitor and a secondary coil, wherein a rectifier is connected between the secondary resonant circuit and the battery of the motor vehicle, wherein the charging device furthermore includes a measuring device designed to evaluate the time function of the voltage amplitude of the secondary resonant circuit after an interruption of the excitation of the secondary resonant circuit,
   wherein the measuring device is designed to determine whether the rectifier is blocking, and the measuring device is further designed to evaluate the time function of the voltage amplitude of the secondary resonant circuit only when the rectifier is blocking.

8. A method for inductive charging of a battery of a motor vehicle by a charging station, having a primary resonant circuit with a primary capacitor and a primary coil for generating an electrical oscillation, wherein the motor vehicle has a secondary resonant circuit with a secondary capacitor and a secondary coil, wherein a rectifier is connected between the secondary resonant circuit and the battery of the motor vehicle, comprising:
   a) excite the primary resonant circuit up to a predefinable voltage amplitude;
   b) interrupt the excitation of the primary resonant circuit; and
   c) evaluate the time function of a decaying voltage amplitude by a measuring device after the interruption of the excitation of the primary resonant circuit,
   wherein the measuring device is designed to determine whether the rectifier is blocking, and the measuring device is further designed to evaluate the time function of the voltage amplitude of the primary resonant circuit only when the rectifier is blocking.

9. The method as claimed in claim 8, wherein in step a) the predefinable voltage amplitude is dimensioned such that the rectifier of the motor vehicle is blocking.

10. The method as claimed in claim 8, wherein in step a) the primary resonant circuit is excited to its rated voltage.

11. The method as claimed in claim 8, wherein step c) is performed in the charging station and/or in the motor vehicle.

\* \* \* \* \*